United States Patent [19]

Kai et al.

[11] 4,415,770
[45] Nov. 15, 1983

[54] MALFUNCTION DETECTION SYSTEM FOR A MOBILE RADIO TELEPHONE SYSTEM

[75] Inventors: Tomokazu Kai; Hidetoshi Nakahara, both of Tokyo, Japan

[73] Assignee: Nippon Electric Co., Ltd., Tokyo, Japan

[21] Appl. No.: 367,852

[22] Filed: Apr. 13, 1982

[30] Foreign Application Priority Data

Apr. 24, 1981 [JP] Japan .................................. 56-62900

[51] Int. Cl.³ ........................ H04B 3/60; H04B 17/00; H04Q 7/04
[52] U.S. Cl. ................................... 179/2 EB; 455/33; 455/56; 455/67
[58] Field of Search ................. 179/2 E, 2 EA, 2 EB, 179/2 EC; 455/33, 54, 56, 67, 34

[56] References Cited

U.S. PATENT DOCUMENTS 4,180,708  1/1980  Yamaguchi et al. ............. 179/2 EB

OTHER PUBLICATIONS

"Mobile Unit for 800 MHz Band Land Mobile Telephone System"–Sakamoto et al., Review of the Electrical Communication Laboratories, vol. 25, No. 11-12, Nov.-Dec., 1977, pp. 1231-1244.
"800 MHz Band Land Mobile Telephone Control System"–Yoshikawa et al., Review of the Electrical Communication Laboratories, vol. 25, No. 11-12, Nov.-Dec. 1977, pp.1172-1190.
"Supervisory and Control Equipment"–Sado et al., NEC Research and Development, No. 57, Apr. 1980, pp. 99-108.

Primary Examiner—Marc E. Bookbinder
Attorney, Agent, or Firm—Sughrue, Mion, Zinn, Macpeak and Seas

[57]   ABSTRACT

A malfunction detection system sends a test calling signal to the mobile base station receiver and receives a response signal from the mobile station transmitter. A controller in the malfunction detection system monitors the access channel for proper operation and transmits an alarm signal to the mobile station controller when a problem is detected.

4 Claims, 7 Drawing Figures

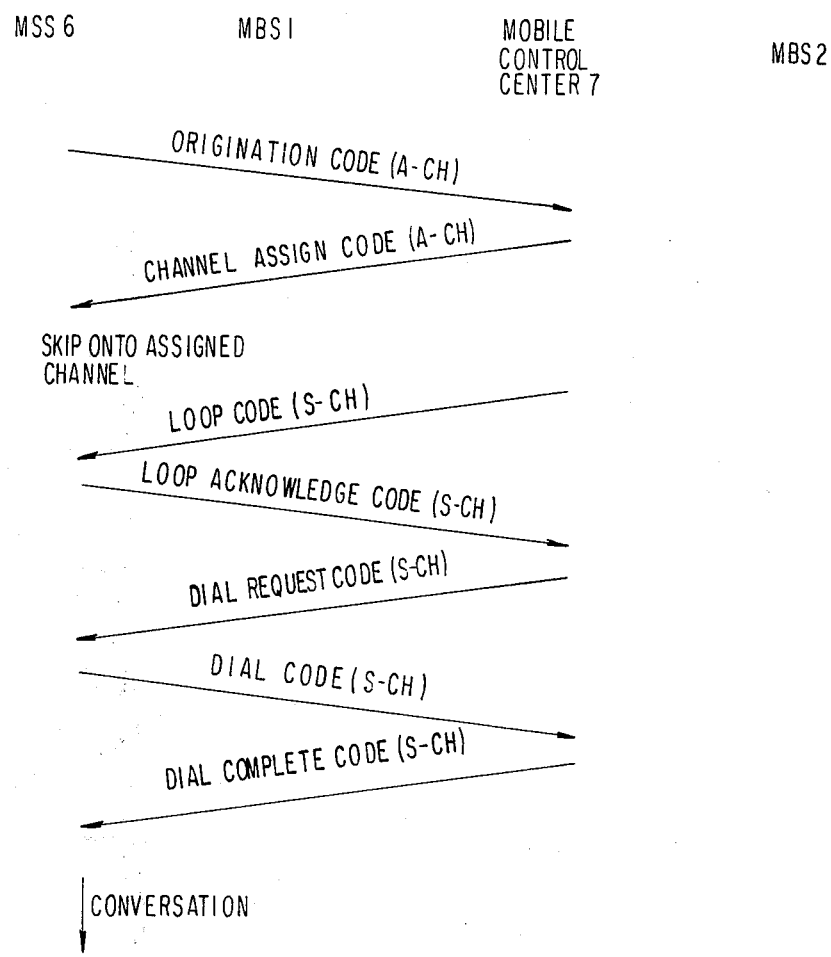

MALFUNCTION DETECTION SYSTEM FOR A MOBILE RADIO TELEPHONE SYSTEM

BACKGROUND OF THE INVENTION

The present invention relates to a mobile radio telephone system having a plurality of speech channels and at least one common control channel, and more particularly to a system for detecting any malfunction in a transmitter/receiver for the common control channel thereof.

Currently available mobile systems of radio telephone communication include the so-called cellular system, wherein the service area is divided into a plurality of small zones, a mobile base station being installed in each zone, and communication is achieved between a mobile subscriber and a fixed subscriber or between mobile subscribers over one of plural speech channels assigned to the mobile base station concerned. There are assigned in this system to each mobile base station for common use by the plurality of mobile subscriber stations in the zone covered by the mobile base station, in addition to a plurality of speech channels, a paging channel for controlling incoming calls to the mobile subscriber stations and an access channel for controlling outgoing calls therefrom. One example of a mobile radio telephone communication system having such a channel arrangement is described in a paper titled "800 MHz Band Land Mobile Telephone Control System" published in "REVIEW OF THE ELECTRICAL COMMUNICATION LABORATORIES", pp. 1172–1190, Vol. 25, Nos. 11–12 (Nippon Telegraph & Telephone Public Corporation, November–December 1977).

In a mobile radio telephone system for achieving communication over multiple speech channels, it is intended to reduce the time required for making call connections and to efficiently use the radio frequencies assigned thereto by the specialized call connection control of the paging and access channels. However, because the paging and access channels are commonly used in a given radio zone, in the event of a problem in the radio transmitter/receivers or on the wire line for the paging and access channels, the mobile subscriber stations present in the zone covered by the troubled mobile base station will become unable either to transmit or to receive calls, affecting the functioning of the whole system.

Therefore, any trouble on the wire line or in the radio transmitter/receivers for the paging and access channels has to be quickly detected and made known to the mobile control center controlling the mobile base stations. The detection of problems on the paging and access channel of a mobile base station is achieved, for example, by constantly monitoring the outputs of the transmitter/receivers. In this way, trouble detection on the paging channel alone can be achieved with comparative ease, because a control signal is initiated on the paging channel from the mobile control center. This system, however, cannot easily detect trouble on the access channel of the mobile base station, due to the random transmission of call signals on the access channel from the mobile subscriber station. Thus, when there is no output from the access channel transmitter and receiver, it is impossible to determine whether the absence of an output is attributable to a problem on the access channel transmitter and receiver or to the absence of a call from the mobile subscriber station.

There has been developed a system in which a test transceiver (TTR) is installed in each mobile base station. A maintenance man, by remote control from the mobile control center, actuates each TTR to send a test transmission signal in response to a report of trouble from a mobile subscriber or in accordance with a periodic maintenance program to detect any trouble on the access channel. For further details on such a system, reference is made to a paper titled "Supervisory and Control Equipment", published in "NEC RESEARCH & DEVELOPMENT", No. 57, pp. 99–108 (April 1980). Although it is a useful system capable of detecting problems on the access channel of the mobile base station, it has a disadvantage in that, if the intervals of maintenance by the maintenance man are too long, it may take a long time for him to detect a problem after it arises or, if the maintenance intervals are reduced to quicken trouble detection, the detecting process will hinder communication by other mobile subscriber stations sending out ordinary call signals.

Another approach adapted to quickly and automatically detect such problems on the access channel receiver is proposed in the pending U.S. patent application Ser. No. 313,406, filed on Oct. 21, 1981, entitled "Method of Detecting Troubles in a Receiver for a Common Control Channel of a Mobile Radio Telephone Communication System and a System Therefor," and assigned to the assignee of this application.

SUMMARY OF THE INVENTION

It is therefore an object of the present invention to provide a further improved mobile radio telephone system capable of quickly and automatically detecting a problem on the access channel transmitter as well as a problem on the access channel receiver.

Another object of the present invention is to provide a mobile radio telephone system capable of automatically detecting a problem in speech channel transmitter or receivers.

According to the present invention, there is provided, in a mobile radio telephone system of the type having mobile subscriber stations; mobile base stations, each mobile base station having a plurality of speech channel transmitter/receivers to transmit and receive signals respectively through a plurality of speech channels and an access channel transmitter/receiver to control calls from the mobile subscriber stations through an access channel; and a mobile control center capable of enabling communication between the mobile subscriber stations and connecting a telephone exchange network to the mobile subscriber stations by way of the mobile base stations, the improvement comprising: detecting means connected to the output of the access channel receiver for detecting both a calling signal originated from the mobile subscriber stations and a test calling signal to provide a detection output; test transmitter means responsive to a first control signal for transmitting the test calling signal to the access channel receiver through the access channel; center controller means responsive to the test calling signal received by the access channel receiver for transmitting a first response signal to test receiver means through the access channel transmitter, the test receiver means receiving the first response signal transmitted from the access channel transmitter; and controller means connected to the detecting means, test transmitter and receiver means and center controller means for generating the first control signal when the detection output is not generated within a first predetermined interval of time and supplying a first alarm signal to the center controller when the received first response signal is not received within a second predetermined interval of time after the transmission of the test calling signal.

Other objects, features and advantages of the present invention will become more apparent from the following detailed description taken in conjunction with the accompanying drawings.

BRIEF DESCRIPTION OF THE DRAWINGS

FIGS. 2A and 2B are diagrams for illustrating how a speech channel, a paging channel and an access channel are used in the system shown in FIG. 1;

DESCRIPTION OF THE PREFERRED EMBODIMENTS

Figure 1:
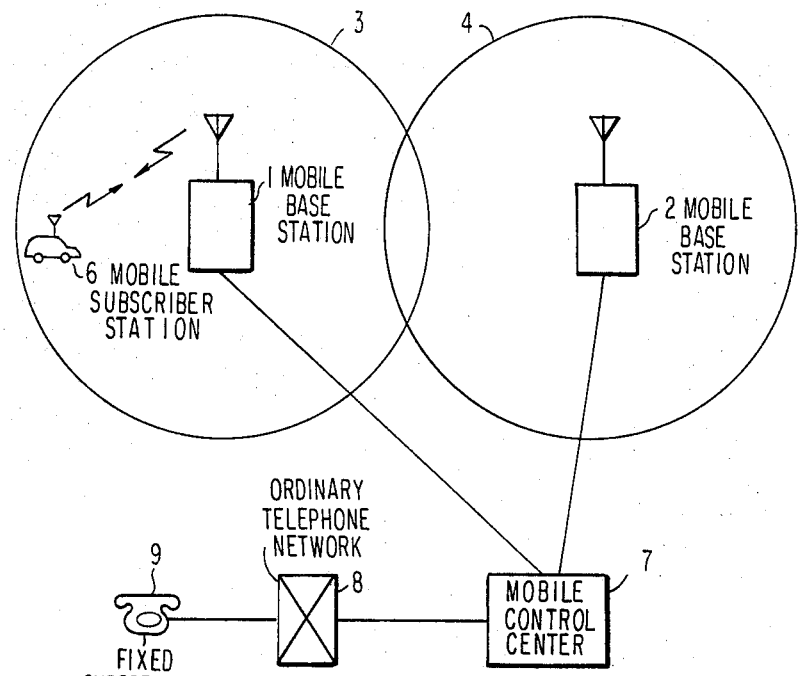
FIG. 1 is a drawing outlining a mobile radio telephone system pertinent to the present invention.

Referring to FIG. 1, mobile base stations 1 and 2 respectively cover the service areas of zones 3 and 4, where their respective radio waves can reach. A mobile subscriber station 6 is in the service area of either one of the mobile base stations 1 and 2, both of which are connected by wire lines to a mobile control center 7 which in turn is linked to fixed subscriber telephone sets 9 by way of an ordinary telephone network 8. The mobile control center 7, though illustrated in a geographically separate place from the mobile base stations 1 and 2, can as well be installed in the same office as either one of the two mobile base stations. To each of the base stations 1 and 2 are assigned a paging channel (P-CH), an access channel (A-CH), and a plurality of speech channels (S-CHs). For these channels, as described hereinafter, each mobile base station is equipped with paging channel, access channel and speech channel transmitter/receivers. The mobile subscriber station has no transmitter/receiver exclusively used for the paging and access channels, but employs a particular transmitter/receiver capable of tuning in these channels by a frequency synthesizer. For further details of this system shown in FIG. 1, reference is made to the above cited literature of NTT.

Figure 2A:
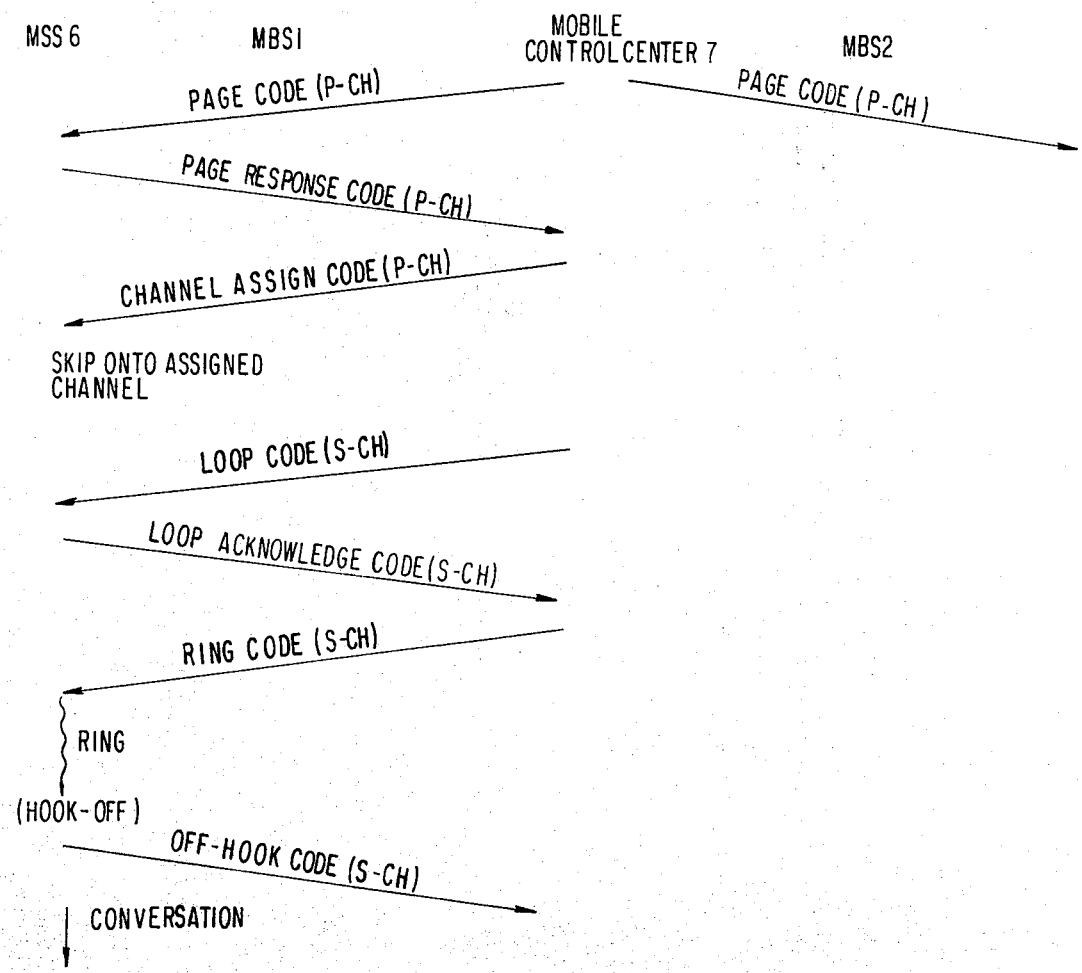

Usually, the mobile subscriber station 6 is awaiting the termination of a call to it, with its reception channel tuned to the paging channel. As illustrated in FIG. 2A, when a call to the mobile subscriber station 6 is originated, a page code is sent from the mobile control center 7 to the station 6 over the paging channel through both mobile base stations 1 and 2. In response to this page code, the mobile subscriber station 6 transmits a page response code over the paging channel. When the mobile subscriber station 6 is within the radio zone 3 (FIG. 1), this page response code is sent to the mobile control center 7 via the mobile base station 1. Upon receipt of the page response code from the mobile base station 1, the mobile control center 7 selects an idle channel out of a plurality of speech channels assigned to the mobile base station 1 and sends to the mobile subscriber station 6 a channel assignment code which designates the number of that idle channel. In response to this channel assignment code, the mobile subscriber station 6 switches its channel to the designated speech channel, and then sends to the mobil control center 7 a loop acknowledge code in reply to the reception of a loop code from the mobile control center 7. After loop acknowledgement by this operation, the mobile control center 7 sends to the mobile subscriber station 6 a ring code, in response to which the mobile subscriber station 6 rings a bell to inform its subscriber of a call addressed thereto. The mobile subscriber then takes its hand set off-hook. With this operation, the mobile subscriber station sends an off-hook code to the mobile control center 7 which receives it to provide for the start of conversation.

On the other hand, when a call is to be originated from the mobile subscriber station 6, a mobile station subscriber picks up its hand set and dials the number of the addressee. With the picking-up of the hand set, the mobile subscriber station automatically switches over its channel from the paging channel to the access channel, over which an origination code is sent to the mobile control center 7, as shown in FIG. 2B. It is to be noted that information on the mobile subscriber's actions from off-hook to dialling is stored in the mobile subscriber station's buffer memory. Upon receipt of the origination code forwarded from the mobile base station 1, the mobile control center 7, as in the foregoing case of paging addressed to the mobile subscriber station 6, sends a channel assignment code to the mobile subscriber station 6 over the access channel. When the mobile subscriber station switches its channel to the designated speech channel and completes loop acknowledgement, the mobile control center 7 sends a dial request code over the speech channel now linked to the mobile subscriber station 6. The mobile subscriber station 6 sends a dial code to the mobile control center 7 in response to the dial request code. If the mobile control center 7 fully receives this dial code, it will send a dial complete code to the mobile subscriber station 6, at the same time call the party with whom the mobile station subscriber intends to have conversation, and establish a speech channel loop, thereby enabling conversation to be started. For an exemplary composition of the mobile subscriber station 6, reference is made to "Mobile Unit for 800 MHz Band Land Mobile Telephone System" in the same issue of NTT, "REVIEW OF THE ELECTRICAL COMMUNICATION LABORATORIES" as the one cited above, pp. 1231–1244.

Figure 3:
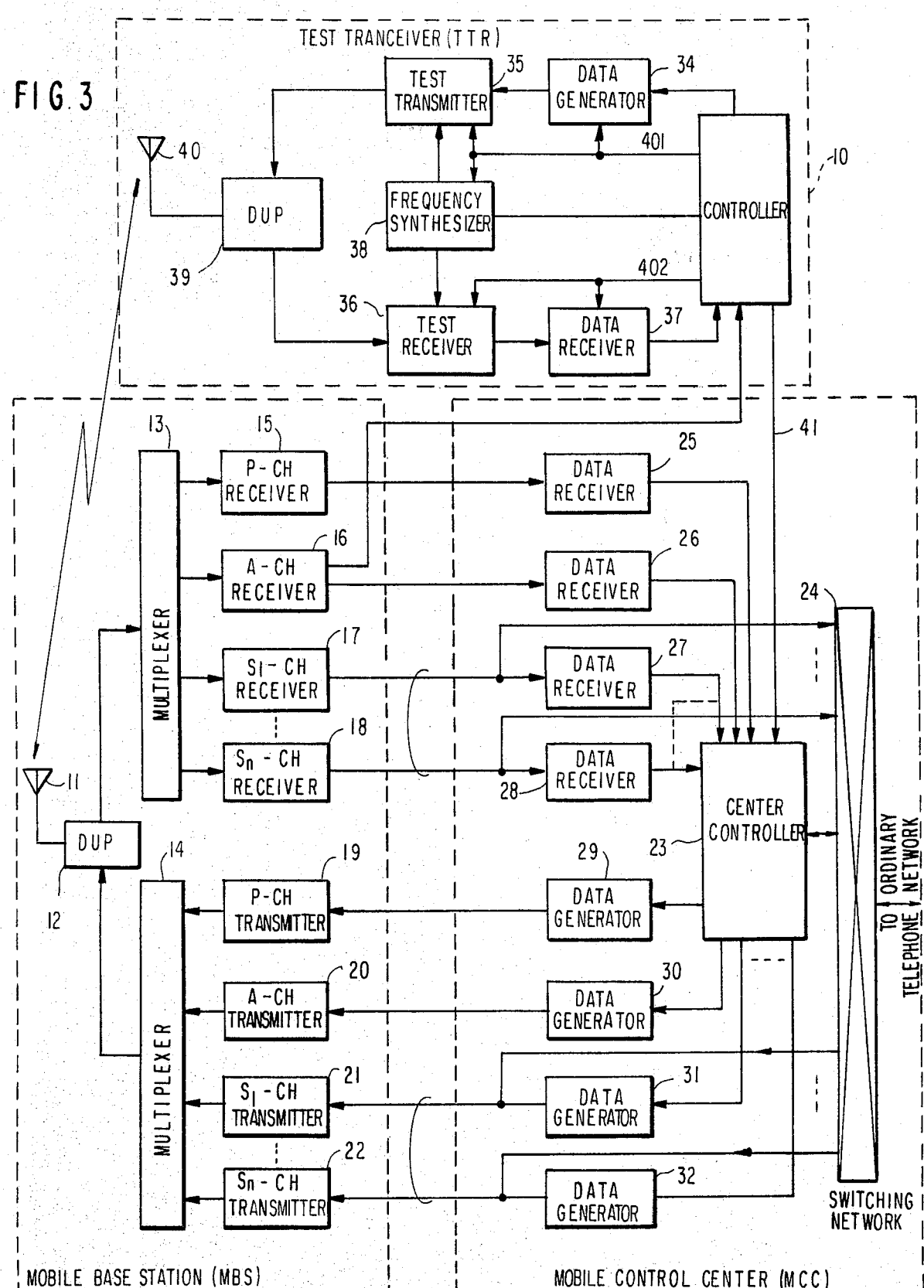
FIG. 3 shows a block diagram of an embodiment of a mobile radio telephone system according to the present invention.

In FIG. 3, the mobile base station 1 (or 2) has a transmitter 19, a receiver 15, both for the paging channel, a transmitter 20, a receiver 16, both for the access channel, and transmitters 21–22 and receivers 17–18, all for speech channels ($S_1$-CH through $S_n$-CH), and all these transmitter/receivers are linked to an antenna 11 via multiplexers 13 and 14 and a duplexer 12. The receivers 15–18 are respectively connected to data receivers 25–28 of the mobile control center 7, the transmitters 19–22 respectively to data generators 29–32 of the same, and the receivers 17–18 and transmitters 21–22 to a switching network 24, which is connected to the ordinary telephone network 8 (FIG. 1) and whose switching control is accomplished with a center controller 23.

The center controller 23, involving a microprocessor, a read-only-memory (ROM), a random access memory (RAM), an input/output (I/O) port and so on, is responsible for the connection control explained with reference to FIGS. 1, 2A and 2B. The microprocessor used for the center controller 23 can be composed of the 8085A manufactured and marketed by Intel Corporation. For details of the 8085A, reference is made to "COMPONENT DATA CATALOG," pp. 6-10 to 6-25, issued by Intel Corporation in January, 1981.

If there is any call reaching the mobile subscriber station, the center controller 23 receives its data from the switching network 24 and gives commands to the data generator 29 for the paging channel to generate page and channel assignment codes. Also it receives from a designated one of the data receivers 27–28 a loop acknowledge code and an off-hook code sent from the mobile subscriber station over the designated speech channel, activiates one of the data generators 31–32 pertinent to the designated channel to generate a loop code and a ring code, and sends codes to the mobile subscriber station. At the same time as the reception of the off-hook code from the mobile subscriber station, the center controller 23 so controls the switching network 24 as to connect the receiver 17 or 18 and the transmitter 21 or 22, whichever are pertinent to the designated channel, to the caller's line. A call from the mobile subscriber station is subjected to similar control to have a speech loop formed. Incidentally, it could be readily understood that data signals for use in this system can be either tone signals or digital signals.

The detection of a problem on the access channel and on part of the speech channels will now be described in detail. The access channel includes the receiver 16, the transmitter 20, the data receiver 26 and the data generator 30, while the speech channels include the receivers 17–18, the transmitters 21–22, the data receivers 27–28 and the data generators 31–32. The trouble will be detected by a test transceiver (TTR) 10.

Although not shown in FIG. 3, the access channel receiver 16 is followed by a noise squelch circuit or a carrier level detector, which is coupled between the receiver 16 and data receiver 26 and will be described later in more detail with reference to FIG. 5. The test transceiver 10 monitors the output of the noise squelch circuit or carrier level detector to determine whether or not the access channel receiver 16 is receiving a calling signal from the mobile subscriber stations (See step 102 of FIG. 4). If the noise squelch circuit or carrier level detector has no detection output within a predetermined time interval (preferably 3 minutes), a controller 33 decides that the telephone system is in a low traffic period in which there are a small number of calling signals from the mobile subscriber stations. Then, the controller 33 activates a data generator 34, test transmitter 35, test receiver 36, data receiver 37 and frequency synthesizer 38 by way of connection lines 401 and 402. Under the control of the controller 33, the synthesizer 38 provides its output to the test transmitter 35 and test receiver 36 so that they tune to the access channel, while the data generator 34 generates a test origination code and supplies it to the test transmitter 35. This test origination code is transmitted from the transmitter 35, through a duplexer 39, antennas 40 and 11, duplexer 12 and multiplexer 13, to the access channel receiver 16 which demodulates the code and in turn supplies it to the center controller 23 (See step 103 of FIG. 4).

In response to the test origination code, the center controller 23 operates the same process as the ordinary origination call of the mobile subscriber station as mentioned above in conjunction with FIG. 2B. In this operation, the center controller 23 searches for a vacant speech channel and sets a speech path corresponding to the searched vacant speed channel, i.e., the assigned speech channel. The speech paths include the speech channel transmitters 21–22, receivers 17–18, data receivers 27–28, data generators 31–32 and so on. The above process is shown in steps 202–204 of FIG. 4. At next step 205, the center controller 23 transmits a channel assignment code having the number information of the assigned speech channel to the test transceiver 10 by activating the data generator 30 and the access channel transmitter 20.

Figure 4:
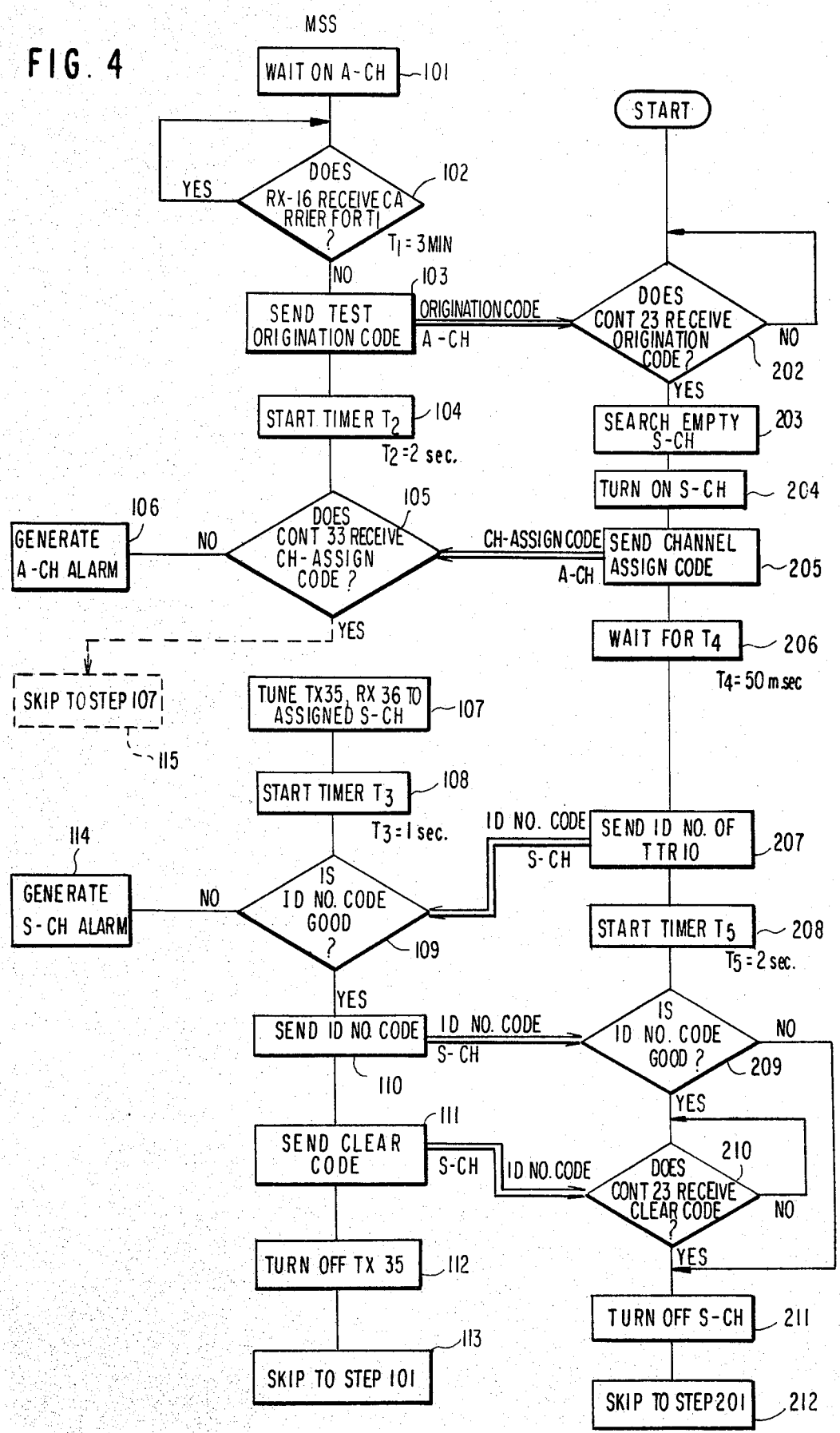
FIG. 4 shows a flow chart for explaining the operation of controllers in a test transceiver and a mobile control center illustrated in FIG. 3.

As shown in steps 104 and 105 of FIG. 4, if the controller 33 does not receive the channel assignment code through the test receiver 36 and data receiver 37 within a predetermined time interval $T_2$ (preferably 2 seconds) after the transmission of the test origination code, it goes to step 106 and provides an alarm signal to the center controller 23 via a control line 41. The alarm signal indicates a problem on the access channel including the access channel receiver 16, access channel transmitter 20, data receiver 26 and data generator 30.

Conversely, if the controller 33 receives at step 105 the channel assignment code within $T_2$, it controls the synthesizer 38 so that both the test transmitter 35 and test receiver 36 tune to a speech channel assigned by the channel assignment code. From step 107 to 111 and from step 206 to 209, a loop check is performed by which the assigned speech channel is checked as to whether it is properly set or not. If the center controller 23 decides that the loop is not yet completed, it will go to step 211 in which the center controller 23 releases the assigned speech channel. If the loop is correctly completed, the assigned speech channel will be held for conversation. The held speech channel, however, must later be released because the test transceiver 10 is used for problem detection rather than for conversation.

Such a release operation will be performed as shown in steps 112 and 210–211. First, the test transceiver 10 transmits a 'clear' code from the data generator 34 via the transmitter 35 to the center controller 23. Next, the center controller 23 receives the 'clear' code and then, in response to it, releases the assigned speech channel. The test transceiver 10 goes to step 113 after the transmission of the 'clear' code, turns off the test transmitter 35, and finally returns to step 101. The center controller 23 also returns to the start step 201.

If the controller 33 does not receive at step 109 its own identification code transmitted from the mobile control center 7 within a predetermined time interval $T_3$ (preferably 1 second) after the switchover to the speech channel assigned in accordance with the channel assignment code, the controller 33 provides the center controller 23 via the control line 41 with an alarm signal indicating that there is a problem on the assigned speech channel. The foregoing access channel and speech channel alarm signals are transmitted in binary code form, so that the center controller 23 can distinguish these alarm signals from one another.

The controller 33 can terminate the operation of trouble detection at step 105 and return step 101, as shown in FIG. 4 by the dotted box 115. In this case, however, the completion of steps 206 to 210 by the center controller 23 deteriorates the line efficiency because there is the lapse of time $T_4$ and $T_5$ ($T_4+T_5=2.05$ seconds) inevitably involved at steps 206 and 208, i.e., the assigned speech channel must be held for $T_4+T_5$. By contrast, the lapse of time for releasing the assigned speech channel in accordance with steps 107-111 and 206-211 has proved to be one half of $T_4+T_5$.

The system of FIG. 3 may have a prefixed channel which is a dummy channel and does not have a corresponding transmitter/receiver. Such a modification is adapted to avoid the above-mentioned deterioration of speech channel efficiency. More definitely, in such a modification, the test transceiver 10 sends a specific origination code, at step 103 of FIG. 4, to the center controller 23 which transmits in response to that code a specific channel assignment code indicating the number of the prefixed channel to the test transceiver 10. Since the center controller 23 does not turn on any speech channel transmitter/receiver, it can eliminate the need for the length of time $T_4+T_5$.

Figure 5:
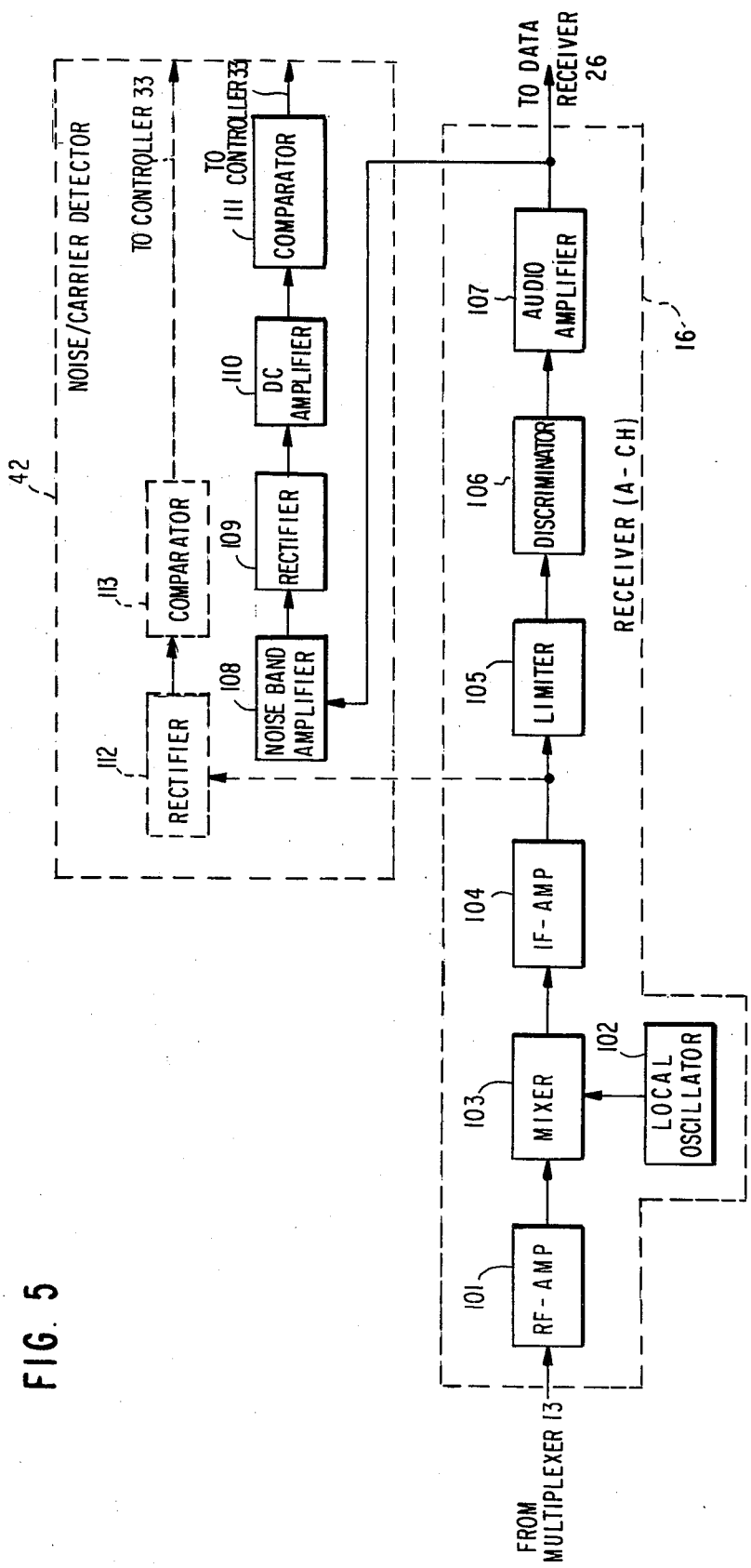
FIG. 5 is a block diagram illustrating one embodiment of a noise/carrier detector according to the present invention.

One example of a detector of the field intensity of the carrier wave or that of the out-band noise (a noise/carrier detector 42) is illustrated in FIG. 5. To describe the noise squelch operation first, a signal from the multiplexer 13 (FIG. 3), after being amplified by a radio-frequency amplifier 101 in the access channel receiver 16, is frequency-mixed with a local oscillation signal from a local oscillator 102 in a mixer 103, and is converted into an intermediate frequency band. The frequency-converted signal, after being amplified by an intermediate frequency amplifier 104, is amplitude-limited by a limiter 105 and supplied to a frequency discriminator 106. The signal, having gone through the frequency discrimination by the discriminator 106, is amplified by an amplifier 107 and is supplied to the data receiver 26 (FIG. 3) and a noise band amplifier 108 in the noise/carrier detector 42. At the noise band amplifier, the noise component in the output of the receiver 16 is amplified and, after passing through a rectifier 109 and a direct current (DC) amplifier 110, is compared with a certain threshold value at a comparator 111. Whether or not a calling signal is received is monitored according to the output of the comparator 111, and this output is supplied to the controller 33 (FIG. 3).

To describe the carrier field intensity monitoring, the output of the intermediate frequency amplifier 104 is supplied to the detector 112, whose output is then led to the comparator 113 for monitoring. Similarly to the use of the noise squelch technique described above, the output of the comparator 113 is applied to the controller 33.

In addition to the noise/carrier detector as shown in FIG. 5, the monitoring can be done by adding a data receiver to the output of the audio amplifier 107 of the access channel receiver 16. The data receiver to be added must be capable of detecting a calling signal from the mobile subscriber stations.

Figure 6:
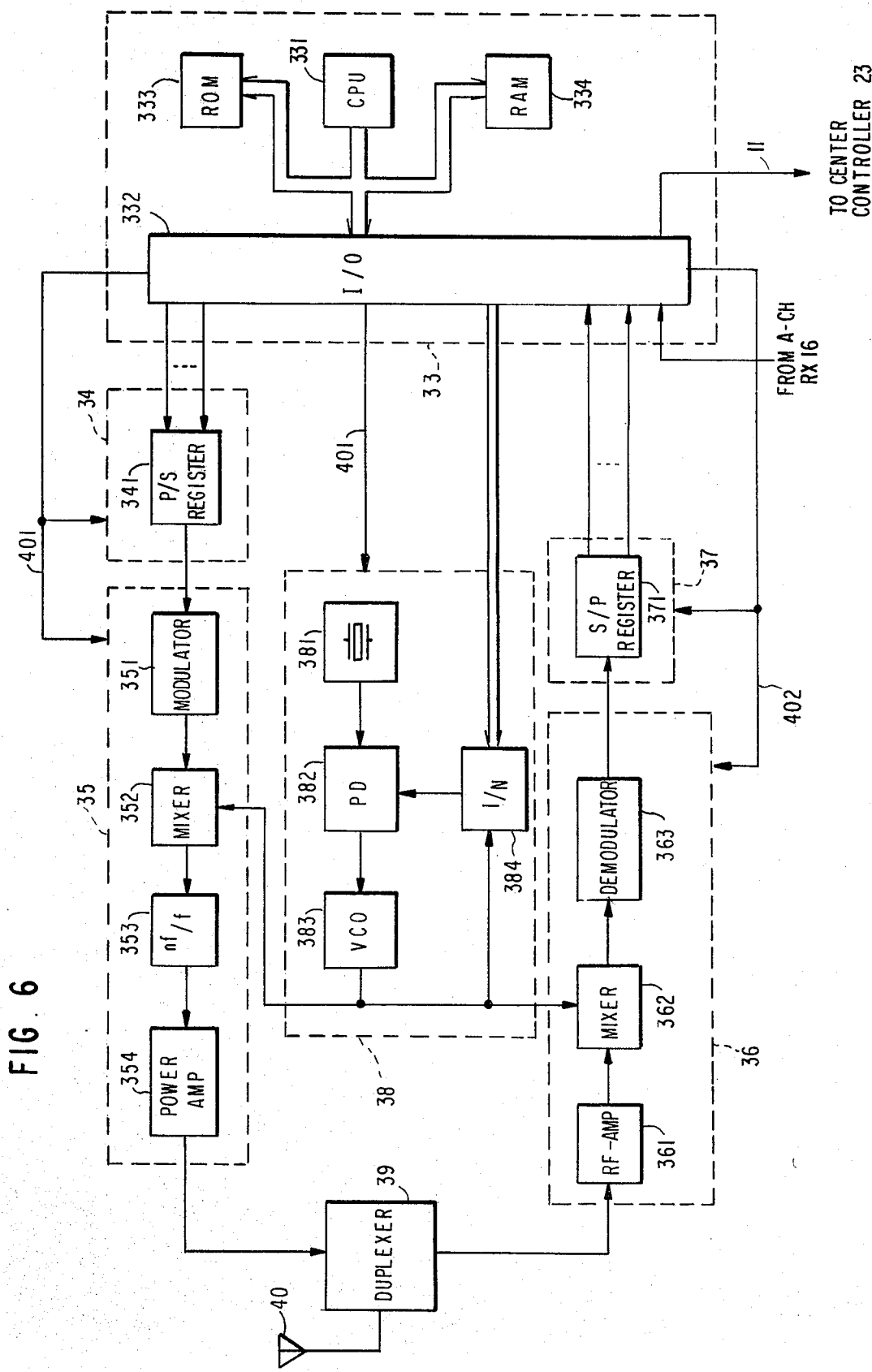
FIG. 6 is a block diagram illustrating an embodiment of the test transceiver of FIG. 3.

FIG. 6 shows a more detailed circuit diagram of the test transceiver 10. The synthesizer 38 is of the phase locked loop (PLL) type as well known in the art. An example of this type of synthesizer is disclosed in "PHASE-LOCKED LOOP SYSTEMS DATA BOOK", pp. 153-161, issued by Motorola Inc., in August, 1973. A variable frequency divider 384 frequency divides the output of a voltage controlled oscillator (VCO) 383 by a predetermined division factor in accordance with the channel assignment signal supplied from a center processing unit (CPU) 331 of the controller 33 via an input-output (I/O) port 332. The frequency-divided signal is compared with an output of a crystal oscillator device 381 at a phase detector 382 to produce a phase error signal. The phase error signal controls the oscillation frequency of the VCO 383. Thus, the VCO 383 is synchronized with the highly stable crystal oscillator device 381 and generates a signal having a frequency representative of the channel assignment signal supplied from the controller 33. The output of the VCO 383 is supplied to both a frequency mixer 352 of the transmitter 35 and a frequency mixer 362 of the receiver 36, as their local oscillation signal.

A carrier wave modulated by data is picked up by the antenna 40 and supplied via the duplexer 39 to a radio-frequency amplifier 361. After amplification, the frequency mixer 362 converts the modulated carrier wave into an intermediate frequency signal. This intermediate frequency signal is demodulated to provide a serial digital signal by a frequency shift keying (FSK) demodulator 363. Depending on the data modulation form, the demodulator 363 may be replaced by a phase shift keying (PSK) demodulator or the like. The serial digital signal thus obtained from the test receiver 36 is converted into a parallel digital signal by a serial-in-parallel-out type shift register 371 and then applied to the CPU 331 via the I/O port 332. The demodulator 363 and register 371 have to be replaced by a frequency discriminator and tone detector, respectively, in the case where the data is in tone signal form.

Meanwhile, parallel digital data provided from the CPU 331 is converted into a serial digital signal by a parallel-in-serial-out type shift register 341 and then applied to the FSK modulator 351. The FSK modulator, which may be of PSK modulation type or the like, modulates a carrier wave with the serial digital signal. When the data is in tone form, the register 341 and modulator 351 have to be replaced by a tone generator and FM type modulator, respectively. The modulated carrier wave is frequency converted by a frequency mixer 352 and a frequency multiplexer 353, and then transmitted through the duplexer 39 and antenna 40, after being amplified by a power amplifier 354. The controller 33 can be composed of the 8085A microprocessor mentioned earlier.

What is claimed is:

1. In a mobile radio telephone system of the type having mobile subscriber stations; mobile base stations, each mobile base station having a plurality of speech channel transmitter/receivers to transmit and receive signals respectively through a plurality of speech channels and an access channel transmitter/receiver to control calls from said mobile subscriber stations through an access chanell; and a mobile control center capable of enabling communication between said mobile subscriber stations and of connecting a telephone exchange network to said mobile subscriber stations by way of said mobile base stations, the improvement comprising:

detecting means connected to the output of said access channel receiver for detecting both a calling signal originated from said mobile subscriber stations and a test calling signal to provide a detection output;

test transmitter means responsive to a first control signal for transmitting said test calling signal to said access channel receiver through said access channel;

center controller means responsive to said test calling signal received by said access channel receiver for transmitting a first response signal to test receiver means through said access channel transmitter, said test receiver means receiving said first response signal transmitted from said access channel transmitter; and controller means connected to said detecting means, test transmitter and receiver means and center controller means for generating said first control signal when said detection output is not generated within a first predetermined interval of time and supplying a first alarm signal to said center controller when the first response signal is not received within a second predetermined interval of time after the transmission of said test calling signal.

2. A mobile radio telephone system, as claimed in claim 1, wherein said first response signal includes a channel assignment code indicating the number of a vacant channel selected out of said plurality of speech channels; wherein said center controller means transmits a second response signal to said test receiver means through the selected vacant channel after the lapse of a third predetermined interval of time from the transmission of said first response signal; wherein said test receiver means receives said second response signal transmitted through said selected vacant channel; wherein there is further provided means for tuning said test transmitter and receiver means to said selected vacant channel in response to a third control signal; and wherein said controller means generates said third control signal when the received second response signal is received within said second predetermined interval of time after the transmission of said test calling signal, and generates a second alarm signal when said second response signal is not received within a fourth predetermined interval of time after the reception of said first response signal.

3. A mobile radio telephone system, as claimed in claim 2, wherein said tuning means includes a frequency synthesizer.

4. A mobile radio telephone system, as claimed in claims 1, 2 or 3, wherein said detecting means includes a noise/carrier detector for detecting at least one of the field intensity of the output of said access channel receiver and the out-band noise of the output frequency of said access channel receiver.

* * * * *

UNITED STATES PATENT AND TRADEMARK OFFICE
CERTIFICATE OF CORRECTION

PATENT NO. : 4,415,770
DATED : November 15, 1983
INVENTOR(S) : Kai et al

It is certified that error appears in the above-identified patent and that said Letters Patent is hereby corrected as shown below:

Column 6, line 9, "speed" should read -- speech --;

Column 8, line 42, "multiplexer" should read -- multiplier --;

line 55, "chanell" should read -- channel --.

Signed and Sealed this

Fifth Day of June 1984

[SEAL]

Attest:

GERALD J. MOSSINGHOFF

Attesting Officer   Commissioner of Patents and Trademarks